(12) United States Patent
Torres Martinez

(10) Patent No.: US 10,124,542 B2
(45) Date of Patent: Nov. 13, 2018

(54) MACHINE FOR PRODUCING PARTS MADE OF COMPOSITE MATERIALS AND METHOD FOR PRODUCING PARTS USING SAID MACHINE

(71) Applicant: Manuel Torres Martinez, Pamplona (ES)

(72) Inventor: Manuel Torres Martinez, Pamplona (ES)

(*) Notice: Subject to any disclaimer, the term of this patent is extended or adjusted under 35 U.S.C. 154(b) by 483 days.

(21) Appl. No.: 14/768,322

(22) PCT Filed: Feb. 25, 2014

(86) PCT No.: PCT/ES2014/070142
§ 371 (c)(1),
(2) Date: Aug. 17, 2015

(87) PCT Pub. No.: WO2014/147270
PCT Pub. Date: Sep. 25, 2014

(65) Prior Publication Data
US 2015/0360423 A1    Dec. 17, 2015

(30) Foreign Application Priority Data
Mar. 19, 2013  (ES) .................................. 201330393

(51) Int. Cl.
*B29C 70/32* (2006.01)
*B29C 70/38* (2006.01)
*B29C 33/46* (2006.01)
*B29C 70/54* (2006.01)
(Continued)

(52) U.S. Cl.
CPC .............. *B29C 70/32* (2013.01); *B29C 33/46* (2013.01); *B29C 37/0003* (2013.01);
(Continued)

(58) Field of Classification Search
CPC ... B29C 70/32; B29C 37/0003; B29C 70/545; B29C 70/543; B29C 33/46; B29C 70/38;
(Continued)

(56) References Cited

U.S. PATENT DOCUMENTS 3,773,447 A * 11/1973 Barratt ..................... B28B 1/20
264/86
3,778,206 A * 12/1973 Barratt ..................... B28B 1/00
264/311
(Continued)

FOREIGN PATENT DOCUMENTS

DE     102010015027 A1    10/2011

OTHER PUBLICATIONS

International Search Report dated Mar. 27, 2014 for PCT/ES2014/070142 and English translation.

*Primary Examiner* — Jeffrey M Wollschlager
(74) *Attorney, Agent, or Firm* — Lucas & Mercanti, LLP

(57) ABSTRACT

The invention relates to a machine for producing parts made of composite materials and method for producing parts using said machine, comprising at least one drum (1) having a perforated wall, provided with a rotary drive, in relation to which there are arranged at least one applicator head (5) for applying strips of fiber, at least one cutting head (7) and at least one assembly (11) for forming tubular parts, while inside the drum (1) there is arranged a blowing system which allows air to be projected through the perforated wall of said drum (1), allowing the production of parts with an open configuration and parts with a tubular configuration using said assembly, by means of laminated surfaces (9) that are formed on the drum (1).

7 Claims, 14 Drawing Sheets

(51) Int. Cl.
*B29C 37/00* (2006.01)
*B29C 53/82* (2006.01)
*B29K 105/08* (2006.01)
*B29L 31/30* (2006.01)

(52) U.S. Cl.
CPC .......... *B29C 70/38* (2013.01); *B29C 70/543* (2013.01); *B29C 70/545* (2013.01); *B29C 53/821* (2013.01); *B29K 2105/0872* (2013.01); *B29L 2031/30* (2013.01)

(58) Field of Classification Search
CPC ... B29C 53/821; B29C 70/326; B29C 33/044; B29C 33/026; B29C 33/065; B29C 33/085; B29C 33/34; B29C 33/36; B29L 2031/30; B29K 2105/0872
See application file for complete search history.

(56) References Cited

U.S. PATENT DOCUMENTS

| | | | | |
|---|---|---|---|---|
| 3,892,623 | A * | 7/1975 | Barratt | B28B 1/20 162/120 |
| 3,900,355 | A * | 8/1975 | Goto | B29C 63/0021 156/187 |
| 5,277,108 | A * | 1/1994 | Akamatsu | B29B 9/04 100/153 |
| 6,692,681 | B1 * | 2/2004 | Lunde | B29C 43/12 156/173 |
| 8,114,241 | B2 * | 2/2012 | Iagulli | B29C 70/32 156/285 |
| 2005/0039843 | A1 | 2/2005 | Johnson et al. | |
| 2012/0129669 | A1 * | 5/2012 | Aoyama | B29C 70/22 492/47 |

\* cited by examiner

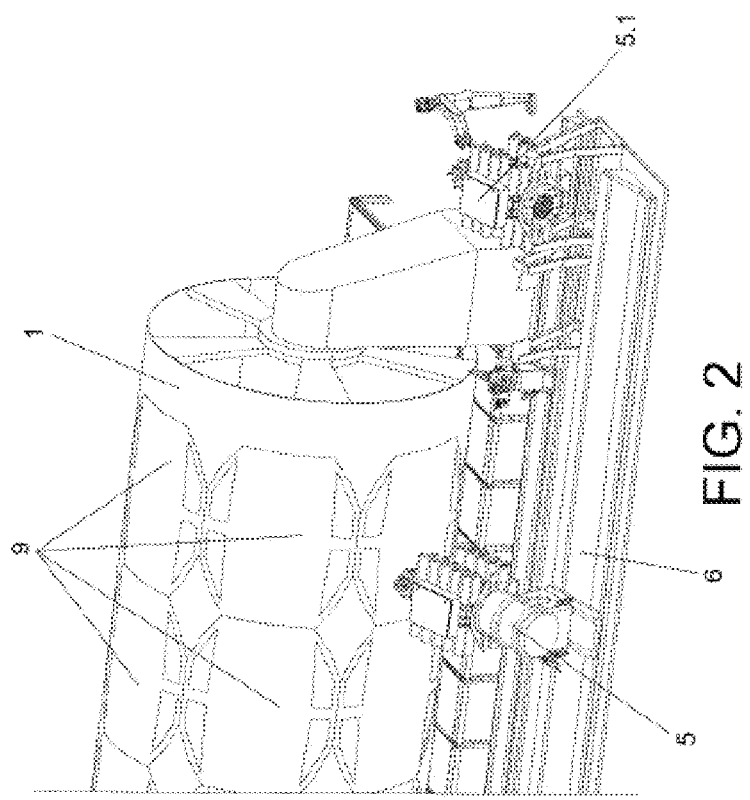

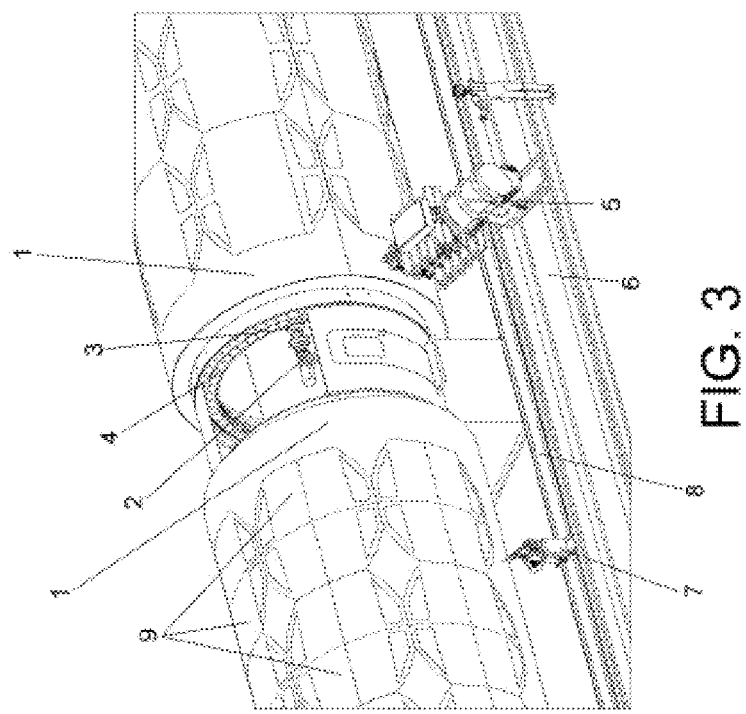

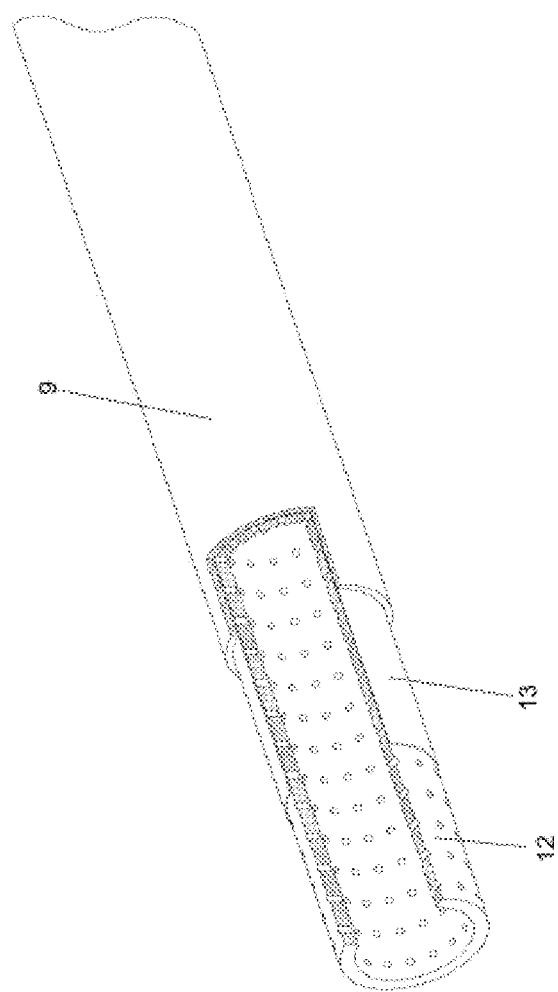

MACHINE FOR PRODUCING PARTS MADE OF COMPOSITE MATERIALS AND METHOD FOR PRODUCING PARTS USING SAID MACHINE

CROSS REFERENCE TO RELATED APPLICATIONS

This Application is a 371 of PCT/ES2014/070142 filed on Feb. 25, 2014 which, in turn, claimed the priority of Spanish Patent Application No. P201330393 filed on Mar. 19, 2013, both applications are incorporated herein by reference.

FIELD OF THE ART

The present invention relates to the production of parts made of composite materials for sectors such as the automotive or aeronautical sector, proposing a machine and a method which allows mass production of parts of that type in a simple, quick and inexpensive manner.

STATE OF THE ART

There is increasing demand in the automotive sector to produce structural parts using composite materials with carbon fiber, glass fiber or others having similar characteristics, which is already very common in other sectors, such as the aeronautical sector, in order to reduce the weight, energy consumption, contamination and costs, as well as to increase safety, due to the capacity of composite material to absorb energy during impacts.

The automotive sector, however, requires mass production of parts with a low cost per part produced, demanding relatively flat parts with an open configuration, such as doors, roofs, hoods, etc., and parts with a tubular configuration with sections having different shapes, for bumpers, body reinforcements, etc., such that means which allow making all those parts in the mentioned production conditions are needed

OBJECT OF THE INVENTION

The invention proposes a machine which allows producing parts made of composite materials, both in an open configuration and a tubular configuration, with a simple mass production method, by means of laminating with strips of carbon fiber, glass fiber or others having similar characteristics.

The proposed machine comprises at least one rotatably mounted drum having a perforated wall actuated by a rotary drive unit, in relation to which there are arranged at least one applicator head for applying strips of fiber and at least one cutting head, which are movable along the drum, and at least one assembly for forming tubular parts also arranged in relation to the rotary drum, there being inside the drum a blowing system provided with nozzles with selective opening arranged in relation to an area located on an outer conveyor belt and in relation to an area corresponding with the situation of each assembly for forming tubular parts.

A machine is thereby obtained in which, by means of the applicator head for applying strips of fiber, there are formed on the rotary drum laminated surfaces corresponding with the configuration of the parts to be obtained, the edges of said laminated surfaces being cut with the cutting head, according to the termination of the parts to be obtained, and by means of the blowing system inside the drum, the laminated surfaces are detached and cut to be unloaded on the outer conveyor belt for taking same to an independent forming method in the case in which they correspond to parts with an open configuration, or for forming tubular parts, by means of the assembly for forming tubular parts, with the laminated surfaces.

The laminated surfaces intended for parts with an open configuration are formed by means of laminating, on the rotary drum, successive layers placed on top of one another with the applicator head for applying strips of fiber, until the thickness of the parts to be obtained; whereas for forming parts with a tubular configuration, independent and separate layers of laminated surfaces are formed by means of laminating, on the rotary drum, with the applicator head for applying strips of fiber, said layers then being successively taken to the assembly for forming tubular parts, in order to place the corresponding layers on top of one another in the formation of the tubular parts to be obtained, which are then formed in an independent method.

The assembly for forming tubular parts comprises a cylindrical tubular mandrel having a perforated wall on which there is arranged an elastic cover, said mandrel being supported on the rotary drum in which the laminated surfaces are formed, while there in turn are supported on the mandrel a tamping roller and a pilot roller which keep it pressed against the rotary drum, the mandrel and the rollers pushing same being arranged with the possibility of controlled separation between them and with respect to the rotary drum, for adapting that separation to the progressive thickness of laminated layers placed on top of one another in the formation of the tubular parts to be obtained.

There is arranged at one end of the machine a preparation and waiting area of a spare applicator head for applying strips of fiber for replacing the applicator head for applying strips of fiber operating in the machine, when the strips of fiber of this head operating in the machine run out, making replacement of said head faster, reducing machine down time for performing that replacement to a minimum.

Additionally, in order to increase productivity the machine is provided with two axially consecutive units, each of them comprising a drum with an independent rotary drive and in relation to the assembly of both units one or more applicator heads for applying strips of fiber and one or more cutting heads, while in relation to the drum of each of the units there are arranged one or more assemblies for forming tubular parts, a common blowing system for detaching the laminated surfaces that are formed on the rotary drums being included inside the assembly of the installation. A machine is thereby obtained in which while one unit is forming the laminated surfaces by means of the applicator head for applying strips of fiber, the other unit can cut the laminated surfaces formed in a preceding cycle with the cutting head, and so on and so forth, which allows producing many parts at the same time.

Based on the foregoing, this machine object of the invention has very advantageous features for producing parts laminated with composite materials for which it is intended, acquiring its own identity and preferred character for the application in sectors, such as the automotive sector, requiring mass production of such parts.

DESCRIPTION OF THE DRAWINGS

FIG. 2 is an enlarged perspective view of a detail of the end of the machine of the invention in which the preparation area of a spare applicator head for applying strips of fiber is located for replacing the applicator head for applying strips of fiber operating in the machine.

FIG. 3 is an enlarged detail of the central area in which the axially consecutive units of the machine are joined to one another.

FIG. 12 is a partially sectioned perspective view of a detail of the end of a mandrel for forming tubular parts in the machine of the invention.

DETAILED DESCRIPTION OF THE INVENTION

Figure 1:
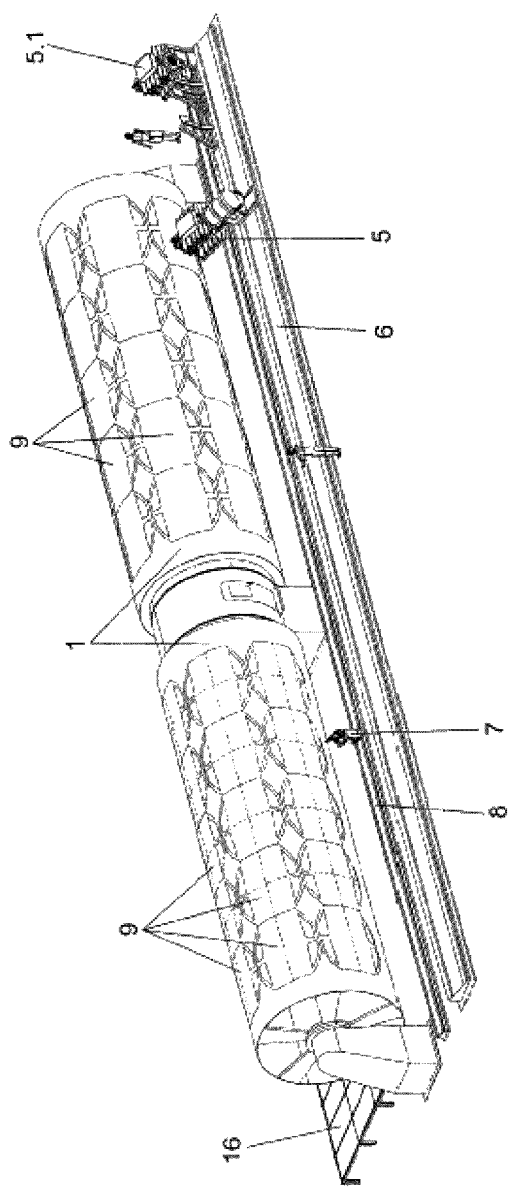
FIG. 1 shows a perspective view of a machine according to the object of the invention made up of two axially consecutive units and in the process for forming laminated surfaces for parts with an open configuration.
Figure 1A:
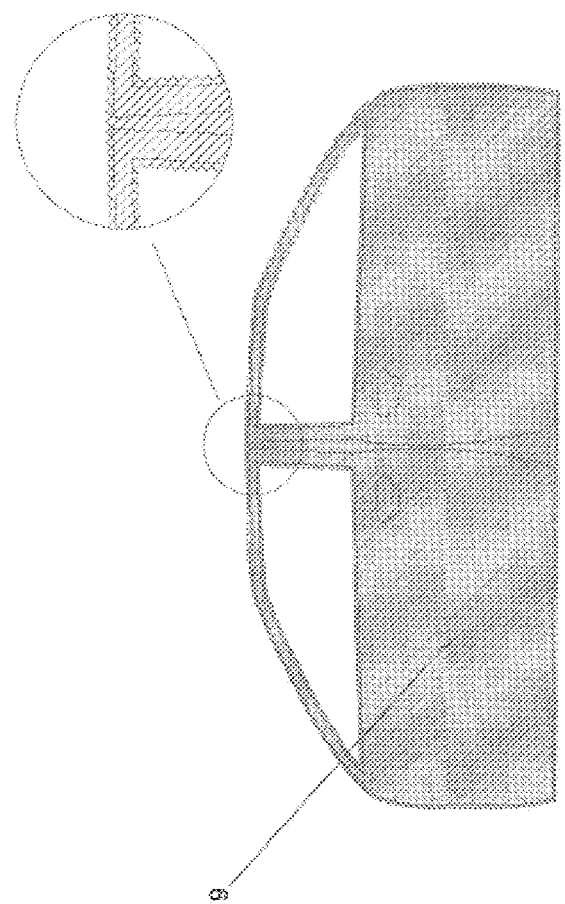
FIG. 1A is a detail of the section of a laminated surface in the machine of the invention for forming two automobile doors.

The object of the invention relates to a machine and a method for producing, in large amounts, parts made of composite materials with carbon fiber, glass fiber or others having similar characteristics, for sectors such as the automotive sector or the aeronautical sector, in which the nature of these materials makes them preferable.

According to the object of the invention, the machine intended for such purpose primarily comprises a rotatably mounted drum (1) having a perforated wall with a rotary drive unit by means of a motor (2) acting, by means of a drive pinion (3), on a ring gear (4) arranged on the drum (1).

In relation to the drum (1) there is arranged at least one applicator head (5) for applying strips of fiber, incorporated such that it is mounted on a guide (6) having longitudinal movement parallel to the drum (1) and with the possibility of moving closer to and farther from the drum, and at least one cutting head (7), in turn incorporated on a respective guide (8) having longitudinal movement and also with the possibility of moving closer to and farther from the drum (1).

Figure 4:
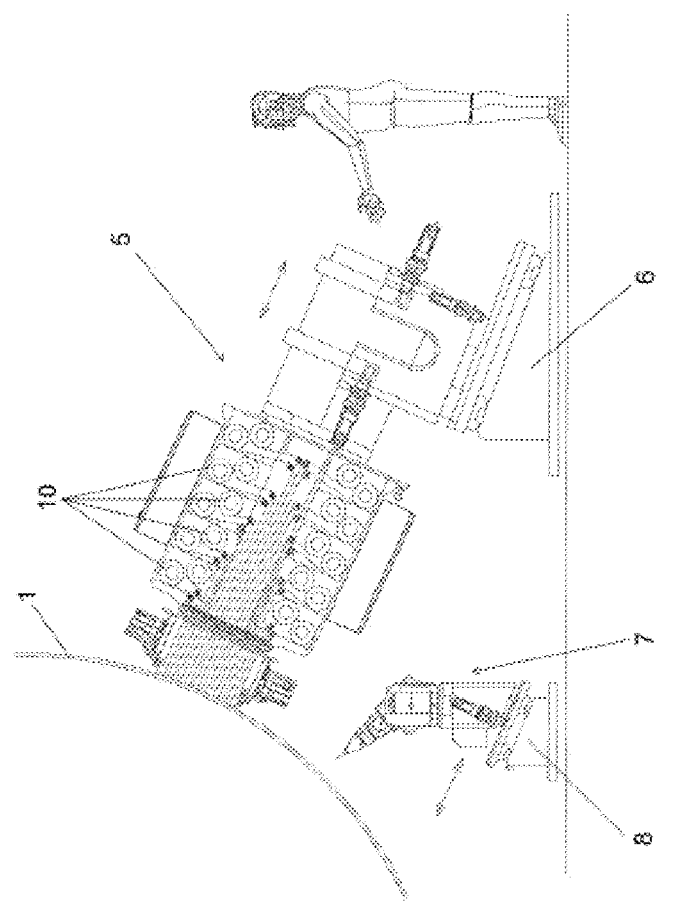
FIG. 4 is an enlarged detail of the arrangement of an applicator head for applying strips of fiber and a cutting head in relation to a rotary drum in the machine of the invention.

The applicator head (5) for applying strips of fiber can be of any type which allows applying one or more strips of fiber for forming laminated surfaces (9) on the drum (1), for example, a head (5) with multiple reels (10) supplying fiber threads for forming with the group of threads a strip of application, such as the example seen in FIG. 4, without this embodiment being limiting.

The cutting head (7) can in turn be of any type which allows precisely cutting the laminated surfaces (9) in relation to the edges of the parts to be obtained; a cutting head (7) for cutting by ultrasound being able to be used, for example, without the head of this type being limiting.

In relation to the drum (1) there is furthermore arranged (FIGS. 5, 9, 10, 11) at least one assembly (11) for forming tubular parts, comprising a cylindrical tubular mandrel (12) having a perforated wall, on which there is arranged an elastic cover (13), as seen in FIG. 12, said mandrel (12) being supported on the drum (1), against which the mandrel is kept supported with pressure by means of a tamping roller (14) and a pilot roller (15) which are in turn supported on the mandrel (12), with a drive that allows separating the mandrel (12) from the drum (1) and the tamping roller (14) and pilot roller (15) from said mandrel (12) in a controlled manner.

Parallel to the drum (1), there is also arranged in the outer portion a conveyor belt (16) and in the inner portion a structure (17) supporting a blowing system (18) provided with nozzles (19) with selective opening that are in relation to an area located above the conveyor belt (16) and in relation to an area corresponding with each assembly (11) for forming tubular parts.

Figure 5:
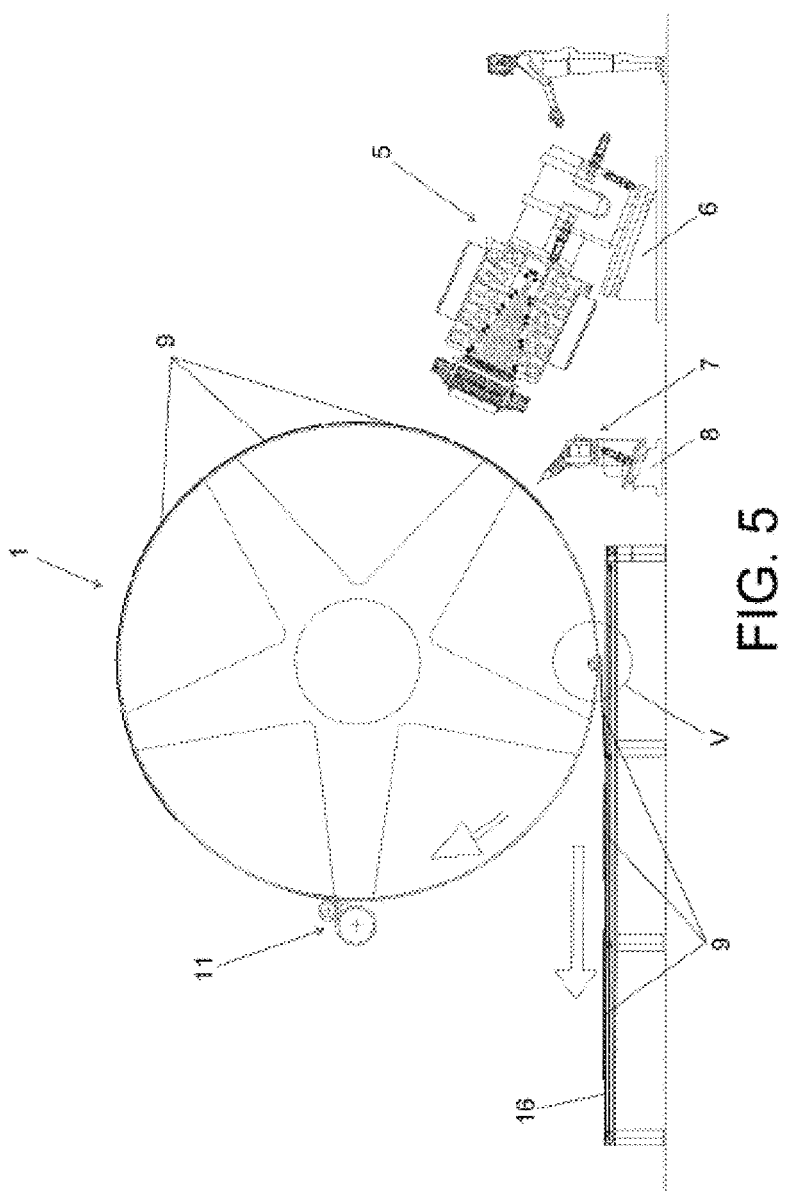
FIG. 5 is a profile view of the machine of the invention in the process for forming laminated surfaces for parts with an open configuration.
Figure 5A:
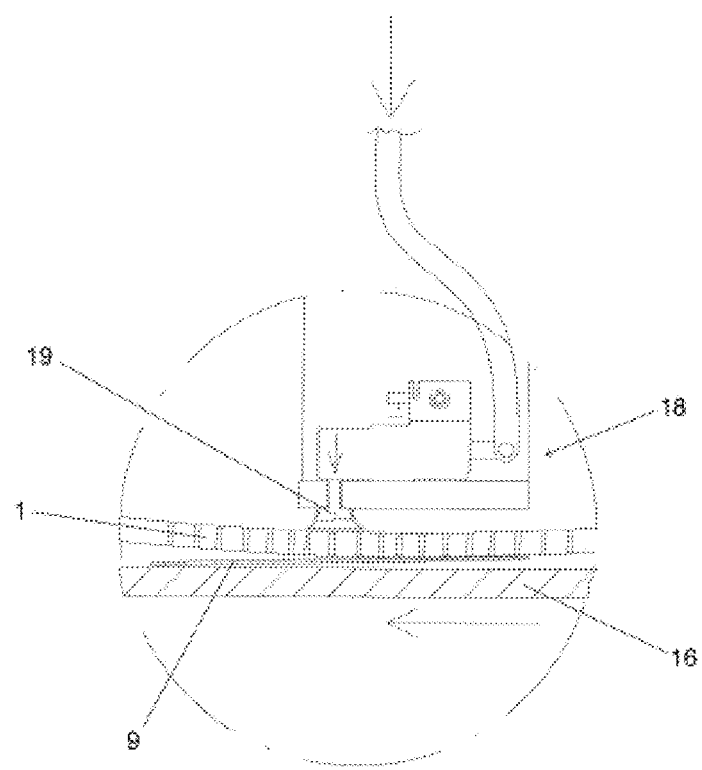
FIG. 5A is an enlarged detail of the area V indicated in the preceding figure.
Figure 6:
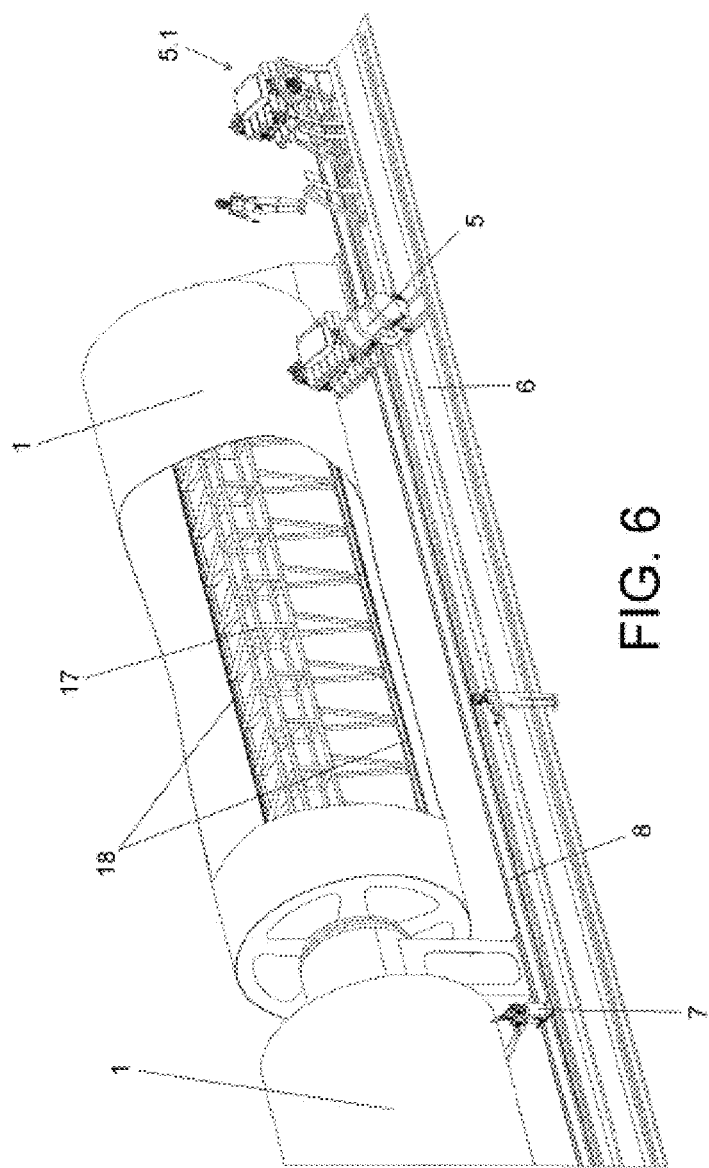
FIG. 6 is a partial perspective view of the machine, with a partially sectioned rotary drum, the structure supporting the blowing system being observed therein.
Figure 7:
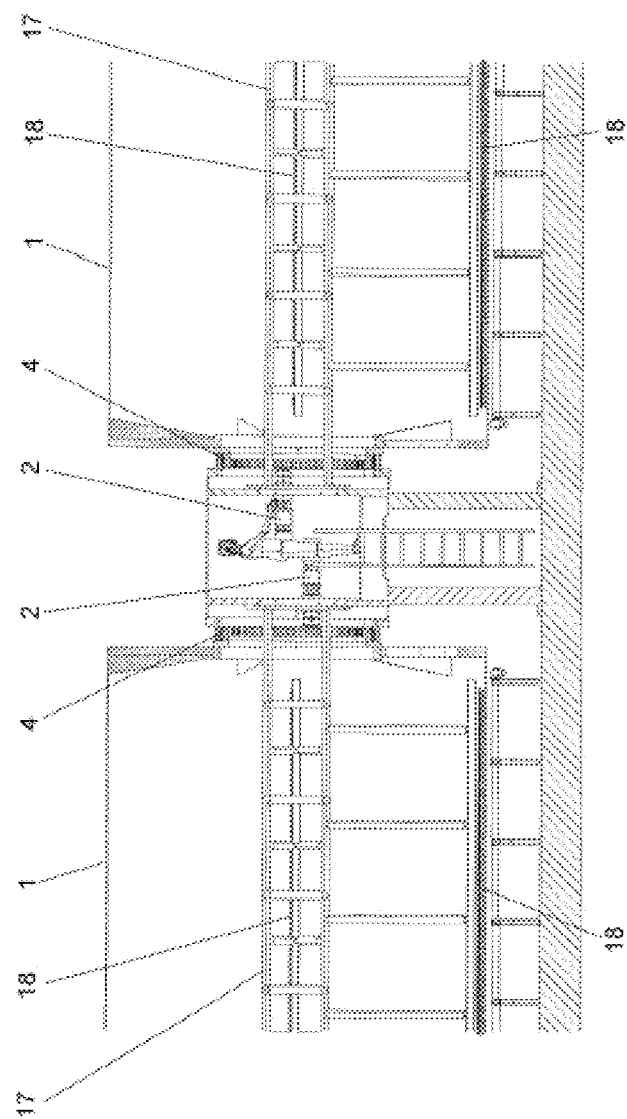
FIG. 7 is an enlarged sectioned view of the central portion of the machine.

All this results in a machine with which, as depicted in FIG. 5, parts with an open configuration, such as doors, roofs and other parts of the vehicle body, can be produced, laminated surfaces (9) being formed on the drum (1) with the applicator head (5) for applying strips of fiber, by means of applying successive lamination layers placed on top of one another, until determining the thickness of the parts to be obtained; which laminated surfaces (9) are then cut with the cutting head (7), on the drum (1) itself, according to the shape of the parts to be obtained; to then detach the cut laminated surfaces (9) by means of projecting air with the blowing system (18) through the holes of the wall of the drum (1), so that the parts to be formed are taken by means of the conveyor belt (16) to an independent forming method.

Figure 8:
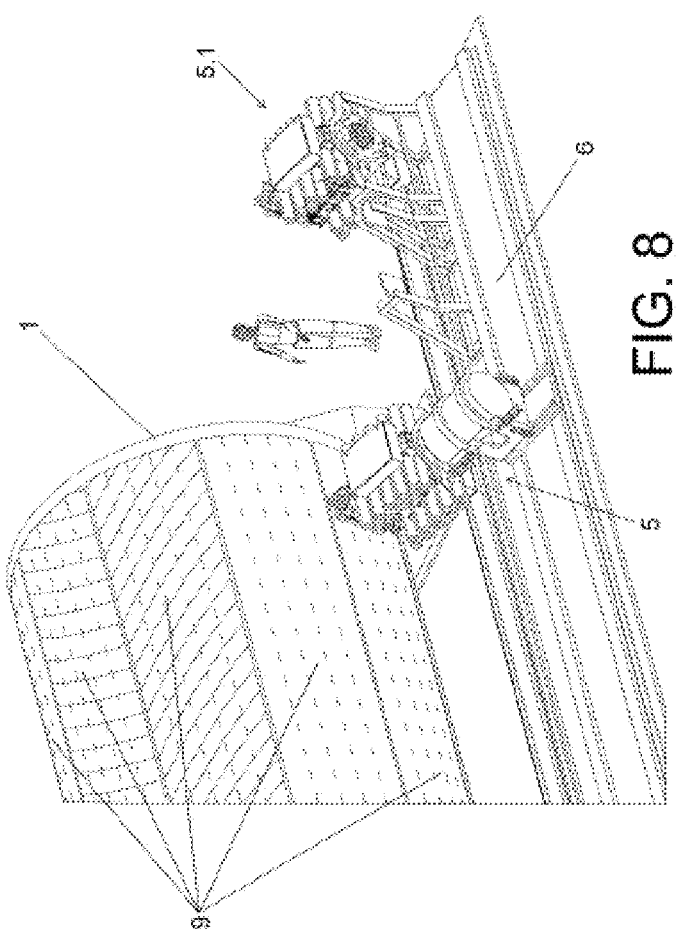
FIG. 8 is a perspective view of an enlarged detail of an end of the machine in the process for forming independent layers of laminated surfaces for forming parts with a tubular configuration.
Figure 9:
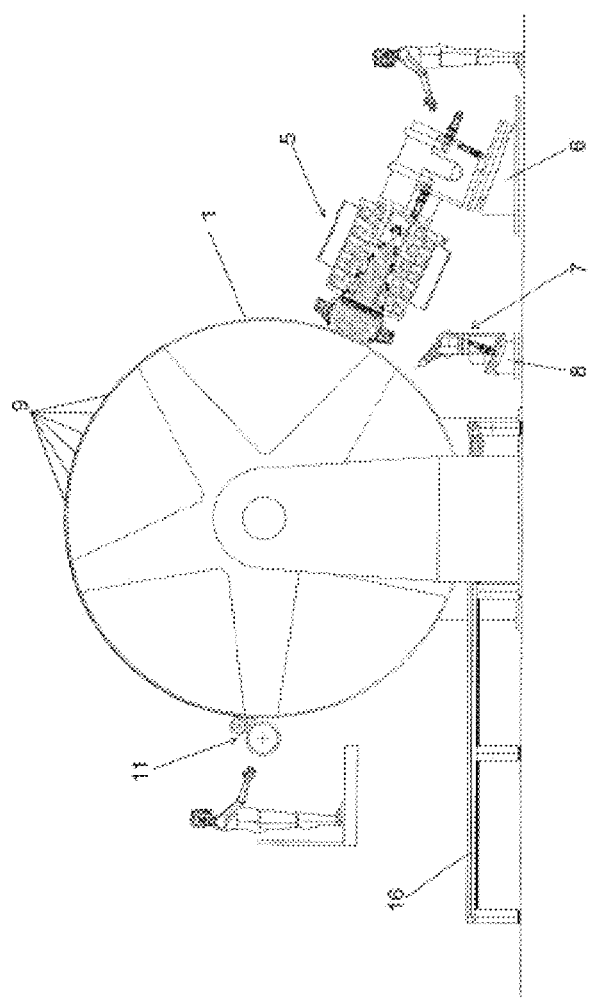
FIG. 9 is a profile view of the machine in the process for forming parts with a tubular configuration.
Figure 10:
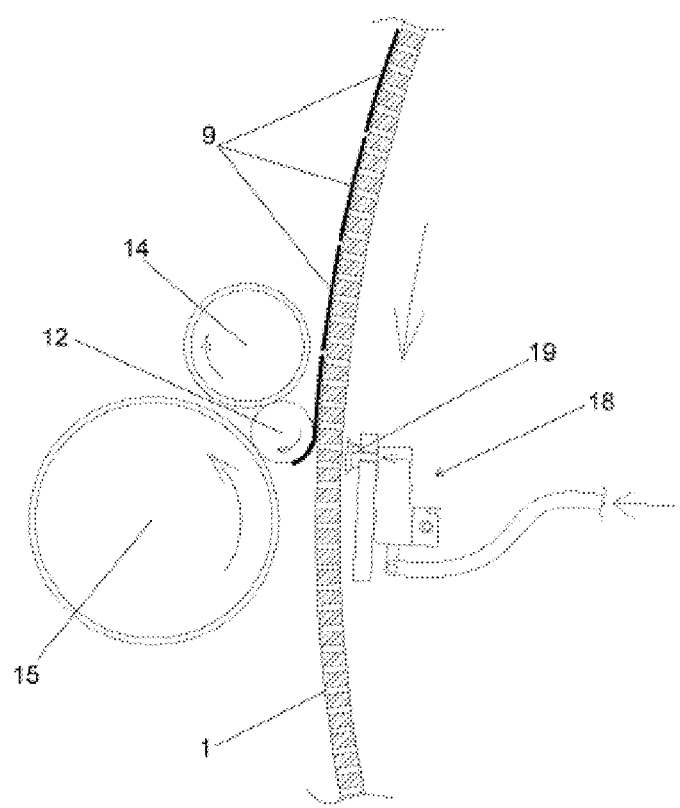
FIG. 10 is an enlarged detail of the formation of a part with a tubular configuration by means of the machine of the invention, in the initial phase in which application of the first layer for forming the tubular part starts.
Figure 11:
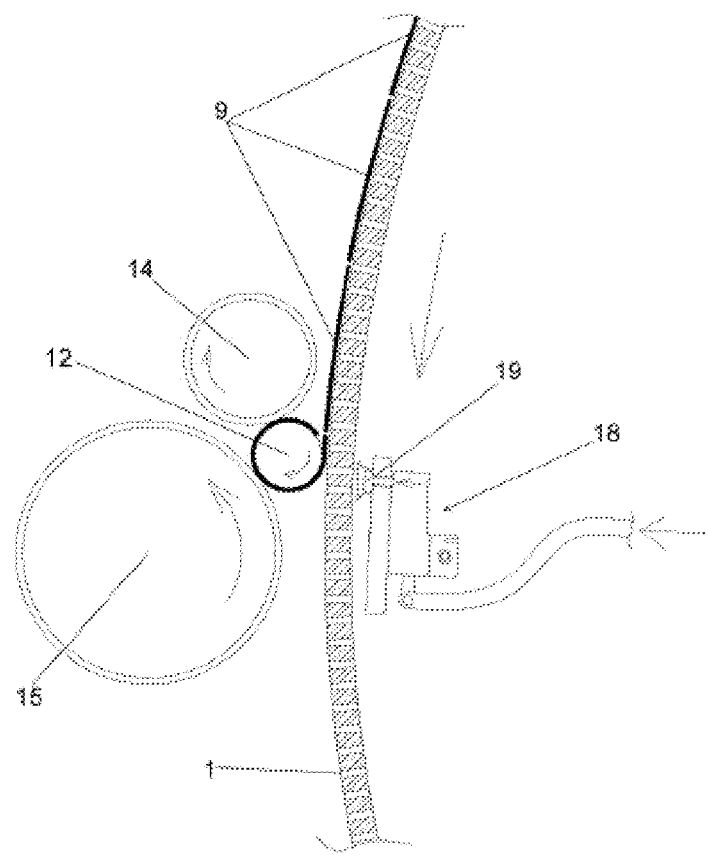
FIG. 11 is the same detail of the preceding figure in the end phase in which application of the first layer for forming the tubular part ends.

Additionally, as shown in FIGS. 8, 9, 10 and 11 tubular parts for bumpers, body reinforcements, etc., can also be produced with the same machine, there being formed on the drum (1) by means of the applicator head (5) for applying strips of fiber independent layers of laminated surfaces (9), with the fibers oriented in different directions, as seen in FIG. 8; the first layer of laminated surface (9) intended for forming the tubular part to be produced then being taken by means of the rotation of the drum (1) to the position of contact with the mandrel (12) of the assembly (11) for forming tubular parts, in which, by means of the combined rotation of the drum (1) and of the mandrel (12) and the projection of air with the blowing system (18) through the holes of the wall of the drum (1), the layer of laminated surface (9) is detached from the drum (1) and is incorporated onto the mandrel (12), being wound thereon, as seen in FIGS. 10 and 11.

Once the first layer of laminated surface (9) is incorporated on the mandrel (12), by means of rotation of the drum (1), the next layer of laminated surface (9) intended for forming the tubular part to be produced is taken to the position of contact with the mandrel (12), in which that second layer of laminated surface (9) is similarly incorporated on the layer previously wound onto the mandrel (12), and so on and so forth, until completing the thickness of the tubular part to be produced, with the layers of laminated surfaces (9) that are necessary; in the method of incorporating the successive layers of laminated surfaces (9), the mandrel (12) is separated from the drum (1) and the tamping roller (14) and pilot roller (15) are separated from the mandrel (12), as progressively needed as the part being formed gradually become thicker.

If there were several assemblies (11) for forming tubular parts, groups of the different types of layers of laminated surfaces (9) are formed on the drum (1), such that when the formation of a tubular part in a assembly (11) for forming tubular parts ends, another tubular part is then formed in another assembly (11) for forming tubular parts, while in the preceding assembly, the unloading of the mandrel (12) corresponding with the tubular part formed thereon is performed, in order to replace same with another which is ready for forming another tubular part.

To separate the formed tubular part from the forming mandrel (12), blowing is performed through the inside of the mandrel (12), whereby through the holes of the wall of the mandrel (12) the elastic cover (13) is forced to slightly expand, the mandrel (12) therefore being free for removal. Once the mandrel (12) has been removed, the assembly of the elastic cover (13) and the layers of laminated surfaces (9) wound thereon are introduced in a specific mold with the shape of the part to be obtained, where by means of expanding the elastic cover (13), the assembly of layers of laminated surfaces (9) is forced to adopt the shape of the part to be obtained.

According to a practical embodiment, in order to improve productivity, the machine is envisaged to be formed by two axially consecutive units, as seen in FIG. 1, each of the units comprising a drum (1) with independent rotary drive, there being in relation to the assembly of both units at least one applicator head (5) for applying strips of fiber and at least one cutting head (7), as well as a common blowing system (18) inside the assembly; while in relation to the drum (1) of each of the units there can be one or more assemblies (11) for forming tubular parts. Therefore, while the applicator head (5) for applying strips of fiber is operating on the drum (1) of one of the units, forming thereon laminated surfaces (9), the cutting head (7) can be operating in the other unit, cutting the laminated surfaces (9) made in a prior operation by the applicator head (5) for applying strips of fiber, which allows obtaining a larger number of parts produced at one and the same time.

Additionally, there is envisaged at one end of the machine a preparation area of an applicator head (5.1) for applying strips of fiber, so that it is on standby, such that when the reels (10) supplying strips of fiber or fiber threads in the applicator head (5) for applying strips of fiber operating in the machine run out, said head (5) is automatically replaced with the head (5.1) located in the standby area, so the replacement takes place very quickly, the necessary machine down time for performing the replacement being very short, which also has an impact on functional machine performance optimization.

The invention claimed is:

1. A machine for producing parts made of composite materials, for producing parts with an open configuration or a tubular configuration, by means of placing multiple laminated layers with strips of fiber comprising:
    at least one rotatably mounted drum having a perforated wall with a rotary drive unit,
    at least one applicator head for applying strips of fiber,
    at least one cutting head,
    at least one assembly for forming tubular parts,
    a conveyor belt arranged parallel to one side of the drum, and
    a blowing system provided with nozzles located inside the drum above the conveyor belt.

2. The machine for producing parts made of composite materials according to claim 1, further comprising
    a first guide placed parallel to the drum wherein the at least one applicator head for applying strips of fiber is mounted thereon such that the at least one applicator head moves parallel with respect to and along the length of the drum, and vertically with respect to the drum thereby moving closer to and farther from the drum;
    a second guide placed parallel to the drum and to the first guide, wherein the at least one cutting head is mounted on the second guide such that the at least one cutting head moves parallel with respect to and along the length of the drum, and vertically with respect to the drum thereby moving closer to and farther from the drum.

3. The machine for producing parts made of composite materials according to claim 1, wherein the at least one assembly for forming tubular parts comprises:
    a cylindrical tubular mandrel having a perforated wall,
    an elastic cover arranged on the cylindrical tubular mandrel,
    a tamping roller and a pilot roller which supports the cylindrical tubular mandrel with pressure against the drum.

4. The machine for producing parts made of composite materials according to claim 1, wherein
    two axially consecutive drums having perforated wall are connected, each drum having an independent rotary drive,
    at least one applicator head for applying strips of fiber and at least one cutting head,
    the blowing system is inside the two axially consecutively connected drums, and
    one or more assembly for forming tubular parts.

5. The machine for producing parts made of composite materials according to claim 1, wherein at one end of the machine there is a preparation and waiting area, wherein a replacement applicator head for applying strips of fiber is on standby and ready for replacement of the applicator head.

6. A method for producing parts made of composite materials using the machine according to claim 1 comprising:
    forming laminated surfaces on the drum using the applicator head for applying strips of fiber,
    cutting the laminated surface with the cutting head to obtain cut laminated surfaces,
    detaching the cut laminated surfaces by projecting air through the perforated wall of the drum and therewith forming the parts to be obtained.

7. The method for producing parts made of composite materials according to claim 6, wherein the at least one assembly for forming tubular parts comprises:
    a cylindrical tubular mandrel having a perforated wall;
    an elastic cover arranged on the cylindrical tubular mandrel;
    a tamping roller and a pilot roller which supports the cylindrical tubular mandrel with pressure against the drum, and
wherein:
    after the step of forming the laminated surface on the drum, the laminated surface is detached from the drum by means of the combined rotation of the drum and of the mandrel and the projection of air with the blowing system through the perforated wall of the drum;

the detached laminated surface forms a first layer and is incorporated onto the mandrel;

once the first layer of laminated surface is incorporated on the mandrel, by means of rotation of the drum, a second layer of laminated surface is obtained and taken to a position of contact with the mandrel, wherein the second layer of laminated surface is placed over the first layer previously wound onto the mandrel, and repeating the formation of the laminated surface, detaching and incorporating onto the mandrel until completing a desired thickness of the tubular part to be produced; and the laminated surfaces are cut and detached from the drum for forming the parts to be obtained.

* * * * *